2,702,234

METHOD FOR PRODUCING HYDRIDES OF THE ALKALINE EARTH METALS

Peter P. Alexander, Beverly, Mass., assignor to Metal Hydrides Incorporated, Beverly, Mass., a corporation of Massachusetts No Drawing. Application October 2, 1953, Serial No. 383,929

7 Claims. (Cl. 23—204)

This invention relates to the production of hydrides of alkaline earth metals, such as barium, strontium and particularly calcium, by conversion of the corresponding anhydrous chlorides or other halide. The invention contemplates the utilization of sodium metal as a principal reactant for effecting such conversion.

It is well known that when sodium metal is heated with calcium chloride a reversable reaction takes place which may be represented by the equation $$2Na + CaCl_2 \rightleftarrows Ca + 2NaCl$$

The United States patent to Harvey N. Gilbert No. 2,029,998 shows that when a material containing about 70% of metallic sodium and about 20% of metallic calcium is added to a fused anhydrous mixture of calcium chloride and sodium chloride containing between 60 and 75% by weight of sodium chloride a reaction takes place which is represented by the equation $$Ca + 2NaCl \rightarrow 2Na + CaCl_2$$

However, the above mentioned patent shows that only when the calcium chloride content of the bath is maintained at a high value, e. g. more than 70% by weight, the following reaction will occur $$2Na + CaCl_2 \rightarrow Ca + 2NaCl$$

Thus, when metallic sodium is reacted with fused calcium chloride not more than about 30% by weight of the calcium chloride can be converted to calcium metal. This is confirmed by the work of E. Rinck, Compt. Rendu, 191, 404–6.

A similar incomplete reaction results when calcium chloride and sodium metal are placed in a confined reaction zone containing an atmosphere of hydrogen heated at a temperature causing fusion but below the distillation temperature of sodium metal. Thus, in the course of my investigations, 66 grams of anhydrous calcium chloride and 23 grams of sodium metal were placed in a confined reaction zone containing hydrogen under a slight pressure and heated at a temperature of about 750° C. for several hours while maintaining a slight hydrogen pressure. Hydrogen had ceased to be absorbed. The resulting product contained 5.5% calcium hydride, the remainder being essentially sodium chloride, sodium metal and unconverted calcium chloride. If the reaction had proceeded to completion, the product should have contained 23.6% calcium hydride.

The present invention is based upon the discovery that anhydrous calcium chloride can be caused to react substantially completely with metallic sodium in an atmosphere of hydrogen to form a reaction mixture comprising essentially calcium hydride and sodium chloride when heated at a temperature above the dissociation temperature of sodium hydride, about 420° C., but below a temperature causing fusion of the halide mixture present during the reaction. Under certain conditions, it is preferable to effect the reaction in two stages. Thus, I may form a reaction mixture comprising calcium hydride, sodium chloride and unconverted calcium chloride by heating anhydrous calcium chloride and sodium metal in the presence of hydrogen at a temperature between about 250° C. and below the distillation temperature of sodium, and preferably, below the dissociation temperature of sodium hydride. The reaction mixture thus produced then may be heated in finely divided solid form in a confined reaction zone in the presence of hydrogen at a temperature between the dissociation temperature of sodium hydride and the temperature causing fusion of the charge.

In accordance with one specific method for practicing the invention, the solid product resulting from reacting calcium chloride and sodium metal in an atmosphere of hydrogen at a temperature causing fusion as above described may be finely divided and placed in a confined reaction zone in an atmosphere of hydrogen under slight pressure and then heated to a temperature between about 420° C. but less than that causing fusion until hydrogen ceases to be absorbed. The resulting product is essentially calcium hydride and sodium chloride.

In accordance with another method for practicing the invention, a preformed finely divided sodium hydride may be intimately mixed with finely divided anhydrous calcium chloride, preferably, in stoichiometric amounts, and the mixture heated in a confined reaction zone in an atmosphere of hydrogen at a temperature between the dissociation temperature of sodium hydride and slightly less than that which causes fusion of the calcium chloride or chloride mixture present during the reaction. The reaction takes place rapidly and goes to substantial completion in a few minutes at temperatures between about 420° C. and 600° C. to produce a reaction mixture consisting essentially of calcium hydride and sodium chloride. The pressure of hydrogen in the reaction zone is sufficient to prevent leakage of air thereinto, a pressure of about one atmosphere being suitable. The sodium chloride can be removed from the reaction mixture by treating the latter with a solvent for sodium chloride which is substantially inert toward calcium hydride to form a liquor comprising a solution of sodium chloride and solid calcium hydride. The solid calcium hydride can be removed from the solution as by filtration. Illustrative solvents are glycerine, propylene glycol, liquid ammonia, etc.

In accordance with a more preferable method for practicing the invention, anhydrous finely divided calcium chloride may be heated in a confined reaction zone in an atmosphere of hydrogen at a temperature between about 250° C. and 375° C. Sodium metal is added in small amounts with agitation of the mixture, the sodium metal being added at intervals to permit each small amount of sodium metal to melt and coat the calcium chloride and react. After the desired amount of sodium metal has been added and hydrogen ceases to be absorbed, a reaction mixture results which comprises sodium hydride, calcium hydride, sodium chloride and unconverted calcium chloride. The agitation then may be discontinued and the temperature of the reaction zone raised to a temperature between the dissociation temperature of sodium hydride, about 420° C., and slightly less than that which causes fusion of the reaction mixture, preferably between about 420° C. and 600° C., to complete the conversion of the calcium chloride to calcium hydride. The latter phase of the reaction is completed in a few minutes. If stoichiometric amounts of calcium chloride and sodium metal are used the reaction product consists essentially of calcium hydride and sodium chloride. The pressure of hydrogen in the reaction zone is sufficient to prevent leakage of air thereinto, a pressure of about one atmosphere being suitable. The sodium chloride may be removed, if desired, by treating the reaction mixture with a suitable solvent as previously described.

While in some instances it is desirable to separate the reaction products this is not necessary for many commercial uses. Thus, the reaction mixture may be used as a drying agent for the dehydration of oils or other compounds in the same way calcium hydride has previously been used. It also may be used for the generation of hydrogen by adding water to it.

The calcium hydride produced by the practice of the present invention, especially when produced by last above described specific method, is extremely finely divided and has an amorphorus, spongy structure. This material is extremely reactive, especially with water. With water, hydrogen is evolved very vigorously and sometimes with sufficient heat to ignite the hydrogen. If this calcium hydride is to be used to generate hydrogen by reacting it with water, it should be treated to lower its reactivity. A suitable treatment for this purpose may comprise heating the calcium hydride to 600° C. to 900° C. under vacuum to dissociate it at least partially to the point where the product contains about 80% free calcium and 20% calcium hydride. Then the product may be rehydrided at a suitable lower temperature.

While the invention is directed particularly to the production of calcium hydride, it is equally applicable for the production of hydrides of other alkaline earth metals, such as barium and strontium by replacing the calcium chloride by barium chloride or strontium chloride. Similarly, the chlorides of these metals may be replaced by other halides, such as the iodice, fluoride or bromide.

The invention is illustrated further by the following specific examples.

*Example 1*

In a reaction vessel fitted with an agitator was placed 222 grams of anhydrous calcium chloride after the vessel had been evacuated to remove air and moisture. This was stirred and heated under hydrogen at a pressure of about one atmosphere to 300° C. when the addition of 92 grams of sodium metal was started. Sodium was added in small increments with continued stirring over a period of 154 minutes and hydrogen was added as fast as it was used up. After all the hydrogen and sodium had been reacted, the mixture was stirred for 15 minutes at 325° C. A total of 312.5 grams of product was recovered (98.5% theory).

The above product was placed in a retort under one atmosphere of hydrogen and heated to 420° C. At this point heat was rapidly evolved and the temperature rose quickly to a maximum of 550° C. Some hydrogen was momentarily evolved but was quickly reabsorbed. The entire reaction was completed in a few minutes. The product was discharged from the retort and analyzed. It contained less than 0.03% unreacted NaH and 25.1% calcium hydride. The remainder was sodium chloride. This represents a 99.8% of theoretical conversion to calcium hydride. Recovery on the second step was 100%.

A ten gram sample of the latter product was extracted with 500 ml. of anhydrous liquid ammonia at —28 to —33° C. The slurry was stirred for 15 minutes and allowed to settle for 5 minutes. The supernatant solution of sodium chloride in liquid ammonia was filtered off by an upward decantation-filtration. The product was washed a second time with 200 ml. of anhydrous liquid ammonia and filtered as previously described. A total of 7 grams of sodium chloride was extracted and recovered from the liquid ammonia. 2.3 grams of $CaH_2$ remained after the extraction and was vacuum dried to remove the last traces of ammonia. The $CaH_2$ analyzed 81.5% $CaH_2$, about 2% sodium chloride and less than 0.1% nitrogen.

*Example 2*

In the reactor described in Example 1 was charged 222 grams of anhydrous calcium chloride after removal of air and moisture. This was stirred and heated under a hydrogen atmosphere to 300° C. Then 92 grams of sodium was added in small increments over a period of 70 minutes. Hydrogen was added as rapidly as it was absorbed. When hydrogen absorption stopped, the temperature of the reactor was raised to 420–450° C. while stirring was continued for 60 minutes. At the end of this period the reactor was cooled under hydrogen, the product discharged and analyzed. It was found to contain 0.35% NaH, 25.0% $CaH_2$, the remainder being sodium chloride. This represents a conversion of 98.9% of theory. Recovery was 98%.

Liquid ammonia extraction of the product was carried out as described in Example 1. From 10 grams of product was recovered 2.6 grams of $CaH_2$ which analyzed 81.5% pure $CaH_2$. 7.4 grams of sodium chloride was recovered from the ammonia solution.

This application is a continuation-in-part of my application Serial No. 360,587, filed June 9, 1953, and now abandoned.

I claim:

1. The method for producing calcium hydride which comprises forming a reaction product comprising essentially calcium hydride and sodium chloride by heating anhydrous calcium chloride and sodium metal in a confined reaction zone in an atmosphere of hydrogen to maintain a temperature therein between the dissociation temperature of sodium hydride and a temperature causing fusion of the chloride mixture present during the reaction.

2. The method for producing calcium hydride which comprises agitating finely divided anhydrous calcium chloride in a confined reaction zone in an atmosphere of hydrogen while heating to maintain a temperature therein between about 250° C. and 375° C. and while progressively adding small amounts of sodium metal until the desired amount of sodium metal has been added and the absorption of hydrogen has ceased thereby forming a reaction product comprising sodium hydride and unreacted calcium chloride, and thereafter heating said reaction product in a confined reaction zone in an atmosphere of hydrogen to maintain a temperature therein above that at which sodium hydride dissociates until hydrogen ceases to be liberated and reabsorbed thereby forming a reaction product consisting essentially of sodium chloride and calcium hydride, said last mentioned temperature being less than the melting temperature of the chloride mixture present during the reaction.

3. The method for producing calcium hydride which comprises agitating finely divided anhydrous calcium chloride in a confined reaction zone in an atmosphere of hydrogen while heating to maintain a temperature therein between about 250° C. and 375° C. and while progressively adding small amounts of sodium metal until the desired amount of sodium metal has been added and the absorption of hydrogen has ceased thereby forming a reaction product comprising sodium hydride and unreacted calcium chloride, thereafter heating said reaction product in a confined reaction zone in an atmosphere of hydrogen to maintain a temperature therein above that at which sodium hydride dissociates until hydrogen ceases to be liberated and reabsorbed thereby forming a reaction product consisting essentially of sodium chloride and calcium hydride, said last mentioned temperature being less than the melting temperature of the chloride mixture present during the reaction, subjecting said last mentioned reaction product to the action of a solvent for sodium chloride which is substantially inert toward calcium hydride thereby producing a liquor comprising a solution of sodium chloride containing solid calcium hydride, and separating the solid calcium hydride from the solution.

4. The method for producing calcium hydride which comprises agitating finely divided anhydrous calcium chloride in a confined reaction zone in an atmosphere of hydrogen while heating to maintain a temperature therein between about 250° C. and 375° C. and while progressively adding small amounts of sodium metal until the desired amount of sodium metal has been added and the absorption of hydrogen has ceased thereby forming a reaction product comprising sodium hydride and unreacted calcium chloride, thereafter heating said reaction product in a confined reaction zone in an atmosphere of hydrogen to maintain a temperature therein above that at which sodium hydride dissociates until hydrogen ceases to be liberated and reabsorbed thereby forming a reaction product consisting essentially of sodium chloride and calcium hydride, said last mentioned temperature being less than the melting temperature of the chloride mixture present during the reaction, subjecting said last mentioned reaction product to the action of liquid ammonia thereby producing a liquor comprising a solution of sodium chloride containing solid calcium hydride, and separating the solid calcium hydride from the solution.

5. The method for producing calcium hydride which comprises heating sodium metal and anhydrous calcium chloride in a confined reaction zone containing an atmosphere of hydrogen to maintain a temperature therein between about 250° C. and the dissociation temperature of sodium hydride thereby forming a reaction product comprising calcium chloride and sodium hydride, and then heating said reaction product in solid finely divided form in a confined reaction zone containing an atmosphere of hydrogen to maintain a temperature therein between the dissociation temperature of sodium hydride and that causing fusion of the charge until hydrogen ceases to be liberated and reabsorbed thereby forming a reaction product consisting essentially of calcium hydride and sodium chloride.

6. The method for producing calcium hydride which comprises forming a finely divided mixture comprising solid anhydrous calcium chloride and solid sodium hydride as the essential reactants, and heating said mixture in a confined reaction zone containing an atmosphere of hydrogen to maintain a temperature therein between the dissociation temperature of sodium hydride and that causing fusion of the charge until hydrogen ceases to be liberated and reabsorbed thereby forming a reaction product consisting essentially of calcium hydride and sodium chloride.

7. The method for producing calcium hydride which comprises forming an intimate mixture comprising anhydrous calcium chloride and sodium metal, and heating said mixture in a confined reaction zone in an atmosphere of hydrogen at a temperature between the dissociation temperature of sodium hydride and the fusion temperature of the chloride mixture present during the reaction until hydrogen ceases to be absorbed thereby converting substantially all the calcium chloride to calcium hydride.

References Cited in the file of this patent

UNITED STATES PATENTS

| | | |
|---|---|---|
| 1,796,265 | Freudenberg et al. | Mar. 10, 1931 |

FOREIGN PATENTS

| | | |
|---|---|---|
| 283,089 | Great Britain | Jan. 5, 1928 |

OTHER REFERENCES

Gibb, Jr., "J. Chemical Education," vol. 25, page 577–582 (Oct. 1948).